(12) United States Patent
Campbell

(10) Patent No.: US 11,113,702 B1
(45) Date of Patent: Sep. 7, 2021

(54) ONLINE PRODUCT SUBSCRIPTION RECOMMENDATIONS BASED ON A CUSTOMERS FAILURE TO PERFORM A COMPUTER-BASED ACTION AND A MONETARY VALUE THRESHOLD

(71) Applicant: Amazon Technologies, Inc., Seattle, WA (US)

(72) Inventor: Brad Campbell, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 73 days.

(21) Appl. No.: 16/218,414

(22) Filed: Dec. 12, 2018

(51) Int. Cl.
*G06Q 30/02* (2012.01)

(52) U.S. Cl.
CPC ..... *G06Q 30/0201* (2013.01); *G06Q 30/0204* (2013.01); *G06Q 30/0253* (2013.01); *G06Q 30/0277* (2013.01)

(58) Field of Classification Search
CPC .............. G06Q 30/02; G06Q 30/0277; G06Q 30/0253; G06Q 30/0251; G06Q 30/0204; G06Q 30/0601; G06Q 30/0631; G06Q 30/0641; G06Q 30/0201
See application file for complete search history.

(56) References Cited

U.S. PATENT DOCUMENTS

| | | | | |
|---|---|---|---|---|
| 4,996,642 A * | 2/1991 | Hey | ................... | G06Q 30/0201 705/7.29 |
| 5,327,508 A * | 7/1994 | Deaton | ................ | G06Q 20/042 382/100 |
| 6,353,447 B1 * | 3/2002 | Truluck | ................... | G09B 5/14 434/323 |
| 6,415,262 B1 * | 7/2002 | Walker | ................... | G06Q 30/02 705/14.25 |
| 7,571,121 B2 * | 8/2009 | Bezos | ..................... | G06Q 30/02 705/26.7 |
| 7,720,723 B2 * | 5/2010 | Dicker | ............... | G06Q 30/0253 705/26.8 |
| 7,827,183 B2 * | 11/2010 | Fraser | .................... | G06Q 10/10 707/748 |
| D636,779 S  * | 4/2011 | Boush | ......................... | D14/486 |
| 7,933,818 B1 * | 4/2011 | Kumar | ............... | G06Q 30/0224 705/35 |

(Continued)

*Primary Examiner* — Scott L Jarrett
(74) *Attorney, Agent, or Firm* — Eversheds Sutherlands (US) LLP

(57) ABSTRACT

Devices and methods are provided for used segmented impact analysis to determine high-valued computer-based actions. The device may determine a first user account associated with performance of a first computer-based action and a second computer-based action associated with a network-accessible resource. The device may determine a second user account associated with performance of the first computer-based action, but not with the second computer-based action. The device may determine a first value for the first user account, the first value based on the performance of the second computer-based action. The device may determine a second value for the second user account, the second value based on the failure to perform the second computer-based action. The device may determine a third value, wherein the third value is a difference between the first value and the second value. The device may send the third value with a product recommendation.

21 Claims, 6 Drawing Sheets

(56) References Cited

U.S. PATENT DOCUMENTS

| | | | |
|---|---|---|---|
| 7,966,225 B2* | 6/2011 | Chan | G06Q 30/02 705/26.7 |
| 8,266,014 B1* | 9/2012 | Bhosle | G06Q 30/0278 705/26.7 |
| 8,700,489 B2* | 4/2014 | Yoshii | G06Q 30/0204 705/26.7 |
| 8,744,906 B2* | 6/2014 | Fordyce, III | G06Q 20/10 705/14.1 |
| 8,799,455 B1* | 8/2014 | Vora | G06F 16/958 709/224 |
| 9,189,811 B1* | 11/2015 | Bhosle | G06Q 30/06 |
| 9,659,310 B1* | 5/2017 | Allen | G06Q 30/0259 |
| 9,665,894 B2* | 5/2017 | Kumazawa | G06F 16/951 |
| 9,773,282 B1* | 9/2017 | Haffey | G06Q 40/12 |
| 10,286,322 B1* | 5/2019 | Wakeford | A63F 13/79 |
| 10,346,900 B1* | 7/2019 | Wilson | G06F 8/38 |
| 10,360,589 B1* | 7/2019 | Channappa | G06Q 30/0251 |
| 10,699,287 B2* | 6/2020 | Rucker | G06Q 30/0201 |
| 2004/0215656 A1* | 10/2004 | Dill | G06Q 30/02 |
| 2005/0154629 A1* | 7/2005 | Matsuda | G06Q 30/0204 705/7.33 |
| 2005/0251440 A1* | 11/2005 | Bednarek | G06Q 30/0207 705/7.32 |
| 2007/0276721 A1* | 11/2007 | Jackson | G06Q 30/0253 705/14.51 |
| 2008/0162258 A1* | 7/2008 | Kala | G06Q 30/0204 705/7.33 |
| 2008/0162268 A1* | 7/2008 | Gilbert | G06Q 30/02 705/7.29 |
| 2009/0100017 A1* | 4/2009 | Graves | G06Q 40/02 |
| 2009/0234716 A1* | 9/2009 | Mallick | G06F 3/0482 705/14.54 |
| 2009/0234722 A1* | 9/2009 | Evevsky | G06Q 30/02 705/14.1 |
| 2010/0100470 A1* | 4/2010 | Buchanan | G06Q 10/10 705/35 |
| 2010/0153242 A1* | 6/2010 | Preston | G06Q 40/00 705/30 |
| 2011/0047072 A1* | 2/2011 | Ciurea | G06Q 30/02 705/39 |
| 2011/0093324 A1* | 4/2011 | Fordyce, III | G06Q 20/10 705/14.27 |
| 2011/0213786 A1* | 9/2011 | Wu | G06Q 30/02 707/749 |
| 2011/0238550 A1* | 9/2011 | Reich | G06Q 30/02 705/35 |
| 2012/0053987 A1* | 3/2012 | Satyavolu | H04M 15/85 705/7.29 |
| 2012/0271879 A1* | 10/2012 | Dedhia | G06Q 10/10 709/203 |
| 2012/0278177 A1* | 11/2012 | Bender | G06Q 30/06 705/14.66 |
| 2012/0316969 A1* | 12/2012 | Metcalf, III | G06Q 30/0269 705/14.66 |
| 2013/0262204 A1* | 10/2013 | Stiles | G06Q 30/0211 705/14.13 |
| 2014/0039950 A1* | 2/2014 | Appel | G06K 9/6267 705/7.11 |
| 2014/0046723 A1* | 2/2014 | Clark | G06Q 40/08 705/7.29 |
| 2014/0067524 A1* | 3/2014 | Douglas | G06Q 30/0246 705/14.45 |
| 2014/0156392 A1* | 6/2014 | Ouimet | G06Q 30/0633 705/14.49 |
| 2014/0180787 A1* | 6/2014 | Sarkissian | H04L 63/08 705/14.41 |
| 2014/0297363 A1* | 10/2014 | Vemana | G06Q 30/0269 705/7.29 |
| 2014/0358635 A1* | 12/2014 | Bao | G06Q 30/0631 705/7.32 |
| 2015/0066614 A1* | 3/2015 | Gilmartin | G06Q 50/01 705/14.14 |
| 2015/0081471 A1* | 3/2015 | Cheng | G06Q 30/0631 705/26.7 |
| 2015/0347412 A1* | 12/2015 | Wolf | G06F 16/335 707/749 |
| 2016/0005072 A1* | 1/2016 | Robinson | G06Q 30/0255 705/7.29 |
| 2016/0034939 A1* | 2/2016 | Strasser | G06Q 30/02 705/14.25 |
| 2016/0086249 A1* | 3/2016 | Zamer | G06Q 30/0639 705/26.7 |
| 2016/0092576 A1* | 3/2016 | Quercia | G06Q 30/0631 707/734 |
| 2016/0110764 A1* | 4/2016 | Priyadarshan | G06Q 30/0244 705/14.53 |
| 2016/0162917 A1* | 6/2016 | Singh | G06Q 30/0204 705/7.33 |
| 2016/0239771 A1* | 8/2016 | Gukal | G06Q 10/0635 |
| 2016/0253692 A1* | 9/2016 | Eaton | G06Q 90/00 705/14.16 |
| 2016/0343057 A1* | 11/2016 | Andon | G06Q 50/01 |
| 2017/0061286 A1* | 3/2017 | Kumar | G06Q 30/0269 |
| 2017/0124580 A1* | 5/2017 | Sharma | G06Q 30/0255 |
| 2017/0193591 A1* | 7/2017 | Narasimhan | G06Q 30/0641 |
| 2019/0087845 A1* | 3/2019 | Kohli | G06Q 20/36 |
| 2019/0171283 A1* | 6/2019 | Dey | G06N 20/00 |

* cited by examiner

ONLINE PRODUCT SUBSCRIPTION RECOMMENDATIONS BASED ON A CUSTOMERS FAILURE TO PERFORM A COMPUTER-BASED ACTION AND A MONETARY VALUE THRESHOLD

BACKGROUND

When users interact with websites, their actions may be used to determine different values of different actions. To determine values of actions, anonymous data from other users may be used. However, some values of web site actions may be inaccurate if the values do not consider specific information regarding users associated with the actions performed because the values for an overall population may not be applicable to all users.

Figure 1:
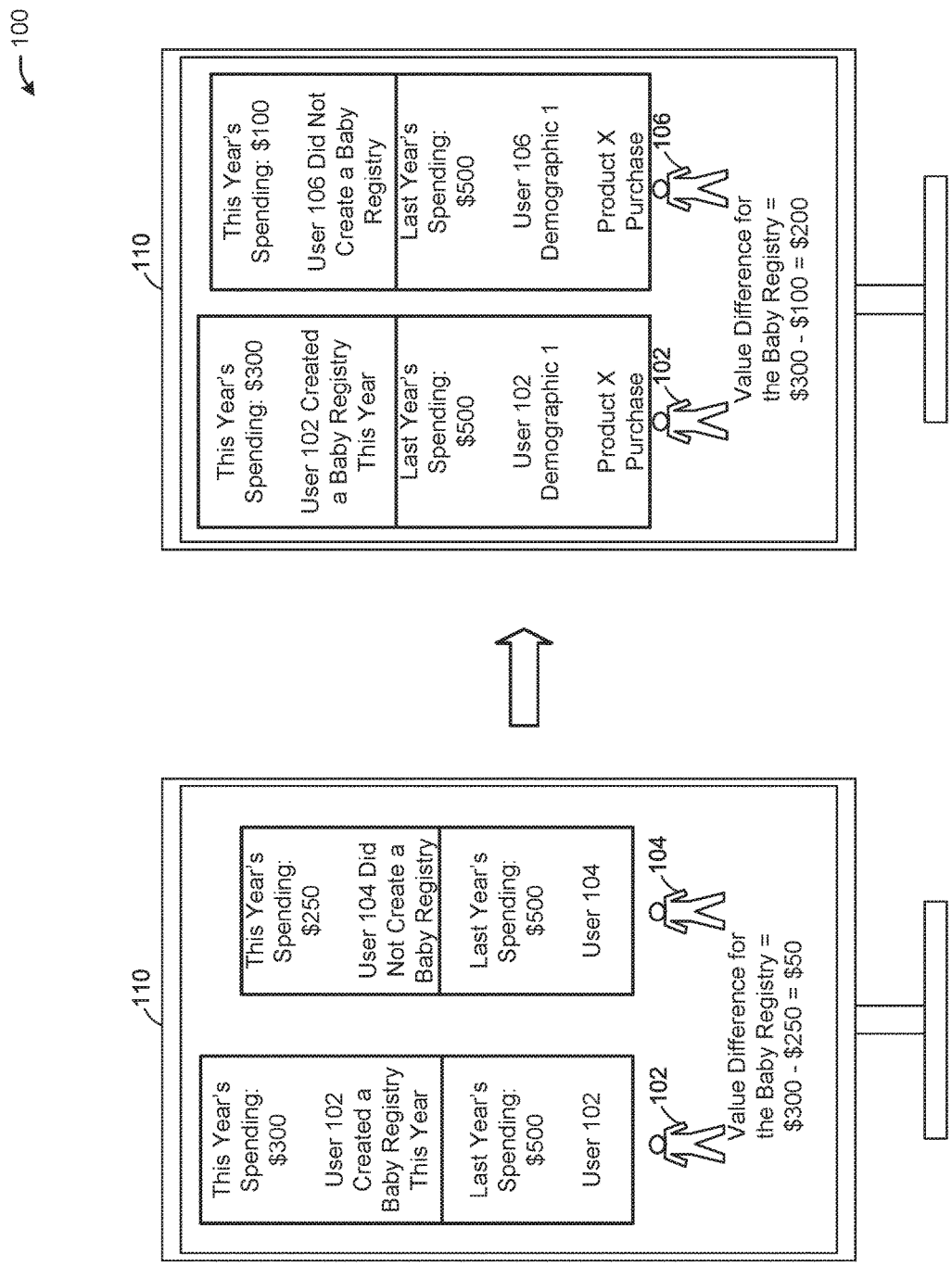
FIG. 1 illustrates an example use case of using segmented impact analysis for computer-based actions, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for performing segmented impact analysis for computer-based actions. A computer-based purchasing system, such as an online purchasing system, may calculate a value (e.g., an impact analysis value) for some or any computer-based actions taken in association with the computer-based purchasing system. An impact analysis value may refer to an incremental benefit of taking an action compared to not taking the action. For example, an increased number of purchases or money spent on purchases after adding a subscription compared to what a user spends on purchases without a subscription. The value may be devoid of customer-specific information (e.g., demographics, user event history, purchase history, search history, etc.). Because the value may be disconnected from customer-specific information, the value may not provide an accurate representation of the difference between performing an action and not performing the action. For example, when considering the value of establishing a gift registry, examining the average value (e.g., an average amount of money spent) from among any users who establish a gift registry may result in a value indicating a small impact of establishing a gift registry versus not establishing a gift registry. This may be because the average amount of money spent by users who did not establish the gift registry may be affected by many factors, so the comparison between establishing the gift registry and not establishing the gift registry may not be a "like-to-like" comparison.

A computer-based purchasing system may include one or more network-accessible resources associated with a purchasing system, such as a web-based purchasing system or a mobile application-based purchasing system. The determination of a value for performing an action may be used by computer-based purchasing system in determining which actions to incentivize, recommend, advertise, etc. For example, if a purchasing a premium subscription with a computer-based purchasing system results in a significantly higher spend than not purchasing a premium subscription, then the purchase of a premium subscription may be associated with a high value. A high-valued action may be an action which should be promoted, so incentives and targeted advertisements may be prioritized to promote higher valued actions over lower valued actions.

In the example of a gift registry, if the gift registry is for wedding gifts, then the value of establishing a wedding gift registry may be enhanced by considering characteristics about other users who establish a wedding gift registry. Characteristics such as demographics, search history, purchase history, subscriptions, user preferences, and/or other characteristics may be used to identify similar users. For example, if a user establishes a gift registry, to determine the value of establishing the gift registry, a similar user who did not establish a gift registry may be identified. If a user establishes a gift registry and is engaged to be married (e.g., as indicated by user input, analysis of user search or purchase history, social media status, etc.), the value of the gift registry may be enhanced by comparing another user engaged to be married, but who did not establish a gift registry. The value therefore may be more specific than establishing a gift registry, and may represent the value of an engaged person in establishing a gift registry. In this manner, a subset of users and their associated monetary spends may be analyzed for value in performing an action rather than the values being skewed by a larger sample size of users whose respective spends may be impacted by a variety of factors.

A computer-based purchasing system may determine a value of an action such as establishing a gift registry by comparing the amounts of money spent by two similar users (e.g., similar based on amounts spent and other categories based on demographics, search history, shopping history, etc.). Using multiple comparisons between pairs of similar users, the respective values representing the multiple comparisons between two similar users may be aggregated by the computer-based purchasing system, which may determine an overall value (e.g., an average or mean value) for taking an action.

In one or more embodiments, the value may be further refined by using a customer-segmented impact analysis in which a computer-based purchasing system evaluates the impact of performing an action associated with a purchasing website given one or more criteria. Such may result in more customer-based value determinations by taking any sub-segments (e.g., categories of customers based on demographics, search and/or purchase history, users preferences, etc.) with which a user or user account is associated, determining a value for a specific action performed by the users or user accounts in the sub-segments, and comparing the value of such customers compared to similar customers who did not perform the same action. When actions are determined to have relatively high values, recommendations may be based on those actions.

High-valued actions may include, for example, watching a video, creating a registry, purchasing an item or subscription, and others. A computer-based purchasing system may determine what actions a user may take and how much money a user may spend using the computer-based purchasing system after a high-valued action has been taken. A computer-based purchasing system may consider related users, for example, based on similar amounts of money the users spend. Comparing users who spent a similar amount of money over a given time period, the value of one user performing an action compared to the other user not performing the action may provide a user-specific value for performing the action.

Segments/categories/sub-segments may be based on purchase history, search history, demographics, user preferences, and/or other characteristics and actions. Related users and high-valued users may be discoverable using segments/categories/sub-segments. For example, a computer-based purchasing system may determine which users spent the most money after performing an action. When a user has a high value (e.g., when the amount of money a customer spent is a threshold amount above an average amount of money for related users), the computer-based purchasing system may identify characteristics about the user, such as to which segments/categories/sub-segments a user belongs. For example, if a user who spends an amount of money significantly higher than the average amount spent by all or a subset of users, the computer-based purchasing system may determine which items a user searched or purchased. The computer-based purchasing system may determine similar users who did not search for or purchase the same items and may determine the difference between the amount of money spent by the user who purchased or searched for the items and the amount of money spent by the user who did not search for or purchase the items. The difference may represent a monetary value considered as the impact analysis value of the action performed.

The computer-based purchasing system may rank actions based on the values associated with the actions. For example, an action with a higher value may be ranked higher than an action with a lower value. In this manner, the ability of the computer-based purchasing system to prioritize actions may be improved using enhanced segmented impact analysis of computer-based actions which account for user behavior in addition to spend. Advertisements, notifications, prioritization of displayed information, and other incentives for actions may be improved using computer-based identification of actions taken in association with a computer-based purchasing system. Computer performance may be improved by enhancing the determination of impact analysis values for computer-based actions, as a computer may identify specific subsets of users, reducing the processing resources needed to calculate impact analysis values and to reevaluate less effective notifications and advertisements based on inaccurate value determinations. Users may also be presented with more relevant options and incentives for use with the computer-based purchasing system.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example use case 100 of using segmented impact analysis for computer-based actions, in accordance with one or more example embodiments of the present disclosure.

Referring to FIG. 1, the use case 100 may include comparing user 102 with user 104 in a segmented impact analysis. A device 110 may display a comparison between user 102 and user 104, who may be related users because, for example, they spent the same amount (or a similar amount) over a given time, such as $500 in a previous year as shown. The user 102 may have created a baby registry during the current year. To determine an impact analysis value representative of the value of creating a baby registry versus not creating a baby registry, the user 104 may be identified as a related use who did not create a baby registry. The user 102 may have spent $300 during the current year after having established a baby registry, and the user 104 may have spent $250 during the current year after the user 102 established a baby registry. Comparing the respective amounts of money spent by the user 102 and the user 104 after the user 102 established a baby registry, the device 110 may determine and present an impact analysis value based on the difference between the respective amounts of money spent by the user 102 and the user 104 after the user 102 established a baby registry (e.g., $300−$250=$50). However, the $50 value may not represent an accurate reflection of the value of establishing a baby registry. The device 110 may determine a more accurate value for the establishment of a baby registry by comparing the user 102 to another user who has something else in common with the user 102, such as a characteristic associated with the action of establishing a baby registry.

Still referring to FIG. 1, the device 110 may determine that the user 106 is a similar/related user to the user 102. For example, the user 102 and the user 106 may be related users because they both spent $500 (or similar amounts of money) during the previous year, and because they share a common demographic. For example, the user 102 and the user 106 may be expecting mothers. By finding related users using enhanced segmentation (e.g., finding one or more common characteristics or actions taken by the users and/or user accounts), the device may find a stronger relationship between related users, and the improved relationship may result in a more accurate value calculation to represent the value of establishing a baby registry. The user 102 may have spent $300 during the current year after having established a baby registry. The user 104 may have spent $100 after the user 102 established a baby registry. Therefore, the value of the baby registry may be $300−$100=$200, which may be more than the value if the comparison were between the user 102 and the user 104.

The value difference between the user 102 and the user 106 may represent a single data point among many aggregated data points used to determine the value of an action such as establishing a baby registry. For example, other similar/related users may be compared using enhanced segmentation. Any comparison between similar/related users may result in a value determination for performing the action. The calculated values from across multiple similar/related user comparisons may be aggregated and used to determine an overall impact analysis value for taking an action. For example, the value difference for the baby registry using the comparison between the user 102 and the user 106 may be $200. Other similar/related users may be compared to each other and may result in different values for the baby registry. The $200 value may be aggregated with the other values from other user comparisons, and an average value for the baby registry may be determined and selected by the device 110 as the impact analysis value for establishing a baby registry.

Segmented impact analysis may improve impact analysis values representing computer-based actions. Using the example of establishing a baby registry, if all user accounts establish a baby registry, then the value of establishing the baby registry may be negligible. To determine the value of a computer-based action such as establishing a baby registry, the device 110 may compare the actions and money spent by users who perform a computer-based action versus users who do not.

In some instances, any user account associated with performance of a computer-based action would match with a similar user account not associated with performance of the same computer-based action. Up until one related user account takes an action, such as establishing a baby registry, the related user accounts may have the same or similar browsing histories, purchase histories, subscriptions, demographics, spend over time, and/or other characteristics. After the computer-based action is performed by one user account, the device 110 may record the behavior of the related users over a period of time and determine what actions they each take, how much money they spend, etc. A segmented impact analysis value of the action taken by one related user and not the other related user may reflect an average of differences in purchases after the computer-based action is performed.

In one or more embodiments, computer-based actions may include computer-based browsing/searching, product and/or subscription purchases, user inputs, establishment of gift registries, and other actions. Some computer-based actions may be associated with higher values than other computer-based actions. For example, a high-value action may include purchasing a premium subscription, creating a product wish list or gift registry, downloading a mobile application, and buying or subscribing to products which lead to more purchases (e.g., as indicated by historical data of user account actions and spend). Other actions may be used to segment users, such as normal browsing using a computer-based purchasing system, adding or changing a billing or delivery address, providing user preferences or product reviews, interacting with content using the computer-based purchasing system, recommending products for other users, requesting information about a product or service, etc. Impact analysis values may be used to determine which computer-based actions are the highest in value, and recommendations such as incentives, targeted advertisements, and notifications may be generated and presented to users to encourage high-value actions. Thus, a device's ability to determine related users may impact the values used to evaluate and promote computer-based actions.

Segmentation may be used to identify related users who make a good match for determining impact analysis values. Segmentation may be based on demographics, online search history, online purchase history, user profile preferences, online user reviews, user subscriptions, webpage views, and other computer-based actions. To identify related users for enhancing the determination of impact analysis values for computer-based actions, the device 110 may identify users in a particular category (e.g., segment), and within the category, may look for users who have the same or similar spending patterns (e.g., amounts), and may identify users who performed a computer-based action and users who did not. The device 110 may identify users who spent a significant amount of money over a given time, such as more than a threshold amount above an average amount of money spent by all or a subset of users. Among high-spend users, the device 110 may identify users who have other similar characteristics/demographics, and may find users who performed one or more computer-based actions along with users who did not perform the one or more computer-based actions. If a user who performed a computer-based action did not spend more after performing that computer-based action than a user who did not perform the computer-based action, then the users may not be a good match, and another user may be identified who did not perform the computer-based action. Users who spend significantly more than the average amount of money over time may be examined for characteristics/segments, and possibly related users having the same characteristics or in the same segments may be compared to identify a related user who spent a similar or the same amount of money over a time period. Once related users who make a good match have been identified, the device 110 may perform segmented impact analysis value determinations.

Figure 2:
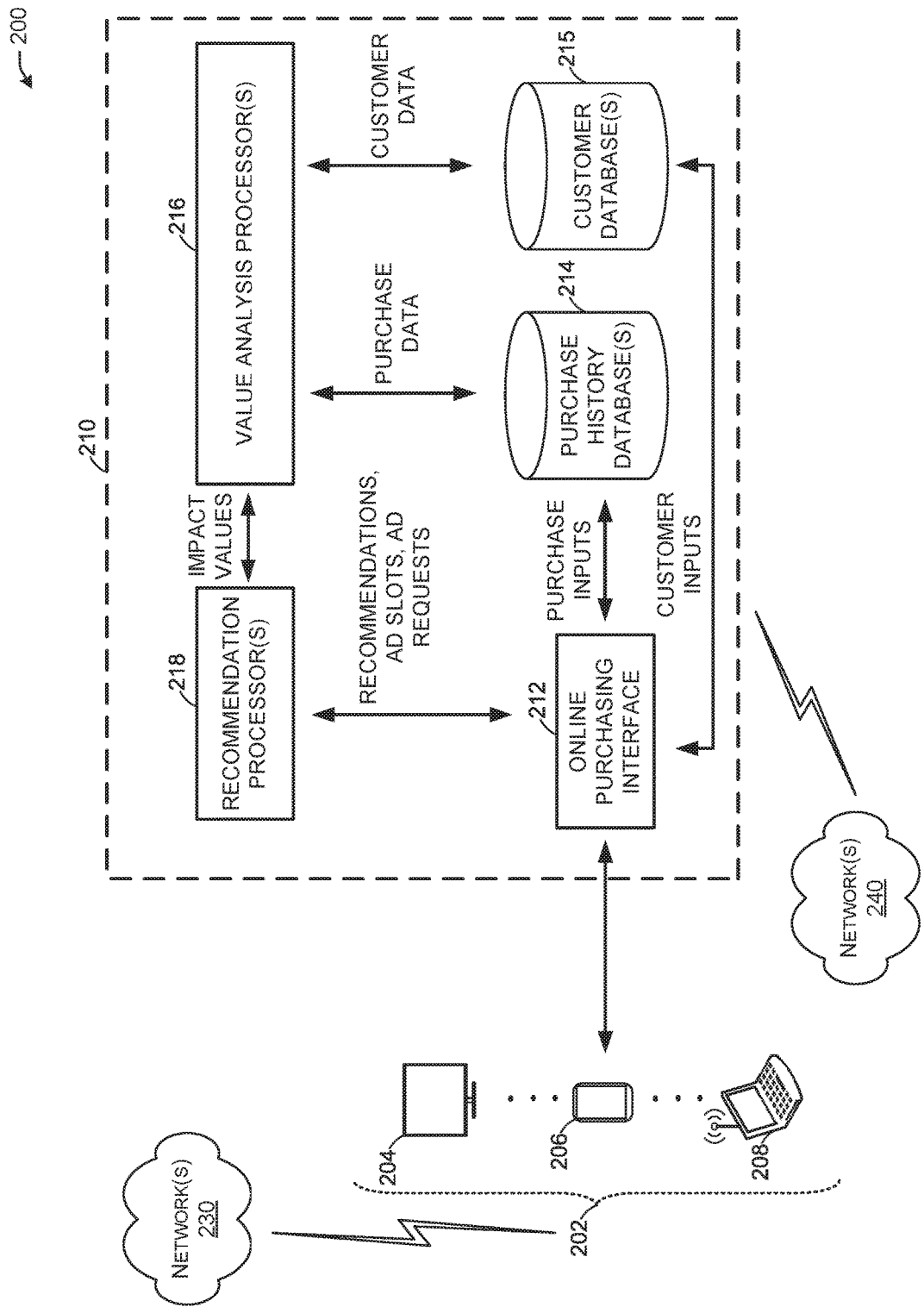
FIG. 2 illustrates a system for performing segmented impact analysis for computer-based actions, in accordance with one or more example embodiments of the present disclosure.

FIG. 2 illustrates a system 200 for performing segmented impact analysis for computer-based actions, in accordance with one or more example embodiments of the present disclosure.

Referring to FIG. 2, the system 200 may include user devices 202, which may include user device 204, user device 206, and user device 208. The user devices 202 may access an online purchasing system 210 (e.g., a network-accessible resource), which may include an online purchasing interface 212, purchase history databases 214, customer databases 215, value analysis processors 216, and recommendation processors 218.

The user devices 202 may access the online purchasing interface 212, which may include one or more interfaces accessible using a web browser, mobile application, or other type of application. The online purchasing interface 212 may allow users to view and purchase products and subscriptions (e.g., subscriptions associated with buying or using content and/or delivery of products when purchased through the online purchasing interface 212), create user accounts, enter product reviews, watch videos, listen to audio files, interact with other users, play games, share content, add items to a virtual shopping cart and/or wish list, and other computer-based actions.

When a user searches for items, purchases an item or subscription, creates user accounts, provides user preferences, or performs other actions, the online purchasing system 210 may store user account information, purchase and search history, subscriptions, user preferences, monetary spend, and other data associated with user accounts and computer-based actions performed by devices executing tasks for user accounts in the purchase history databases 214 and the customer databases 215. For example, user account credentials may be stored in the and customer databases 215, and search and purchase history, subscriptions, event/data logs indicating that devices performed computer-based actions may be stored in the purchase history databases 214. The purchase history databases 214 and the customer databases 215 may store categorized/segmented user accounts based on the amounts of money accounts spend over time (e.g., monthly, yearly, etc.), the products/categories of products users purchase or subscribe to, demographics associated with users of the user accounts, search history, and other computer-based actions taken by user accounts.

The value analysis processors 216 may access the data stored in the purchase history databases 214 and the customer databases 215. For example, the value analysis processors 216 may identify user accounts and the computer-based actions taken by those user accounts. The value analysis processors 216 may identify user accounts based on categories/segments, and may determine related users based on the amounts of money the user accounts have spent using the online purchasing system 210 over a time period. The value analysis processors 216 may determine an impact analysis value for any computer-based action by comparing related users who performed a computer-based action to users who did not perform the computer-based action. For example, the value analysis processors 216 may determine whether a user account associated with performance of a computer-based action spent more money after performance of the computer-based action than a similar user account associated with not performing the computer-based action. If not, then the users may not be a good match as related users to determine the value of having performed the computer-based action because the value is not positive. If the value is positive, the value may be indicative of the impact of performing the computer-based action. The value analysis processors 216 may determine characteristics about a user, such as demographics or segments, and may identify users who share a demographic and/or segment to identify users who may be a good match for determining the impact analysis value of performing an action. The value analysis processors 216 may identify two users with similar characteristics, one who performed a computer-based action using the online purchasing system 210, and one who did not perform the computer-based action. If the users spent a similar amount of money using the online purchasing system 210 before one user performed the computer-based action, then the impact analysis value of performing the computer-based action may be represented by the amount of money the user who performed the computer-based action spent after the performance compared to the amount of money spent by the user who did not perform the computer-based action.

The recommendation processors 218 may use the impact analysis values determined by the value analysis processors 216 for respective computer-based actions using the online purchasing system 210, to determine and generate recommended actions for user accounts based on computer-based actions the user accounts have performed or not performed. Recommended actions may include sending notifications, advertisements, incentives, suggested products or actions, and other customized recommendations based on historical user activity and the determined impact values of performing computer-based actions. The recommendation processors 218 may rank recommendations and computer-based actions based on the impact analysis values determined by the value analysis processors 216.

High-valued computer-based actions associated with the online purchasing system 210 may be unknown for specific categories/segments. For example, a segment may include user accounts which have purchased athletic equipment. While the online purchasing system 210 may know generally that having a subscription to the online purchasing system is a high-valued action among the general population of user accounts, the value of having the subscription may be significantly higher or lower among the population of user accounts in an athletic equipment segment. For example, user accounts in an athletic equipment segment may be no more or less likely to increase their spend after adding a subscription, but user accounts in a segment for user accounts who have purchased music or videos may be associated with significantly increased spending using the online purchasing system 210 once those user accounts have added a subscription. The value of a subscription specifically among athletic equipment purchasers may not be as high as the value of a subscription among music and video purchasers. Therefore, recommendations for a subscription may be prioritized for other user accounts who have purchased music and videos without a subscription, resulting in more targeted advertisements, offers, and other incentives to encourage user accounts to subscribe.

To determine high-valued actions within specific segments/categories of user accounts, the value analysis processors 216 may analyze data stored in the purchase history databases 214 and the customer databases 215 to determine which actions performed by user accounts within a segment/category are associated with the largest increases in spend. If a user in a segment performs an action such as purchasing a first product and subsequently increases spending more than another user who purchases a second product, the value analysis processors 216 may determine that the value of the first product is higher than the value of the second product. The value analysis processors 216 may analyze the actions taken by user accounts and the amounts of money spent by the user accounts after taking the actions. In this manner, the value analysis processors 216 identify the highest valued actions performed using the online purchasing system 210 among users in a specific category/segment.

Using high-valued actions, the value analysis processors 216 may determine an impact analysis value representing the difference between performing the high-valued actions and not performing the high-valued actions. The value analysis processors 216 may determine, using two related user accounts in which one user account performed an action and the other user account did not perform the action, the difference in the respective amounts of money spent after one user performed the action. The value analysis processors 216 may identify users with the highest increases in spending after performing an action, or the users who spend the most money in general, and may determine which segments/categories are associated with those users. If a user's spend or spending increase is higher than a threshold amount above the average user in general or within one or more segments/categories, the value analysis processors 216 may identify which actions those users have taken in order to analyze the value of those actions compared to users who did not perform those actions. Actions determined to be high-valued actions may be provided to the recommendation processors 218 to determine which actions to promote, incentivize, advertise, etc. The recommendation processors 218 may provide recommendations in the form of notifications and advertisements through the online purchasing interface 212 (e.g., presenting advertisements and notifications in a web browser or mobile application accessible to the user devices 202). For example, a high-valued action may be presented in a banner advertisement slot at the top of a webpage accessed by the user devices 202.

Any of the user device(s) 202 (e.g., user devices 204, 206, 208), and the online purchasing system 210 may be configured to communicate with each other via one or more communications networks 230 and/or 240 wirelessly or wired. Any of the communications networks 230 and/or 240 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 230 and/or 240 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 230 and/or 240 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 3:
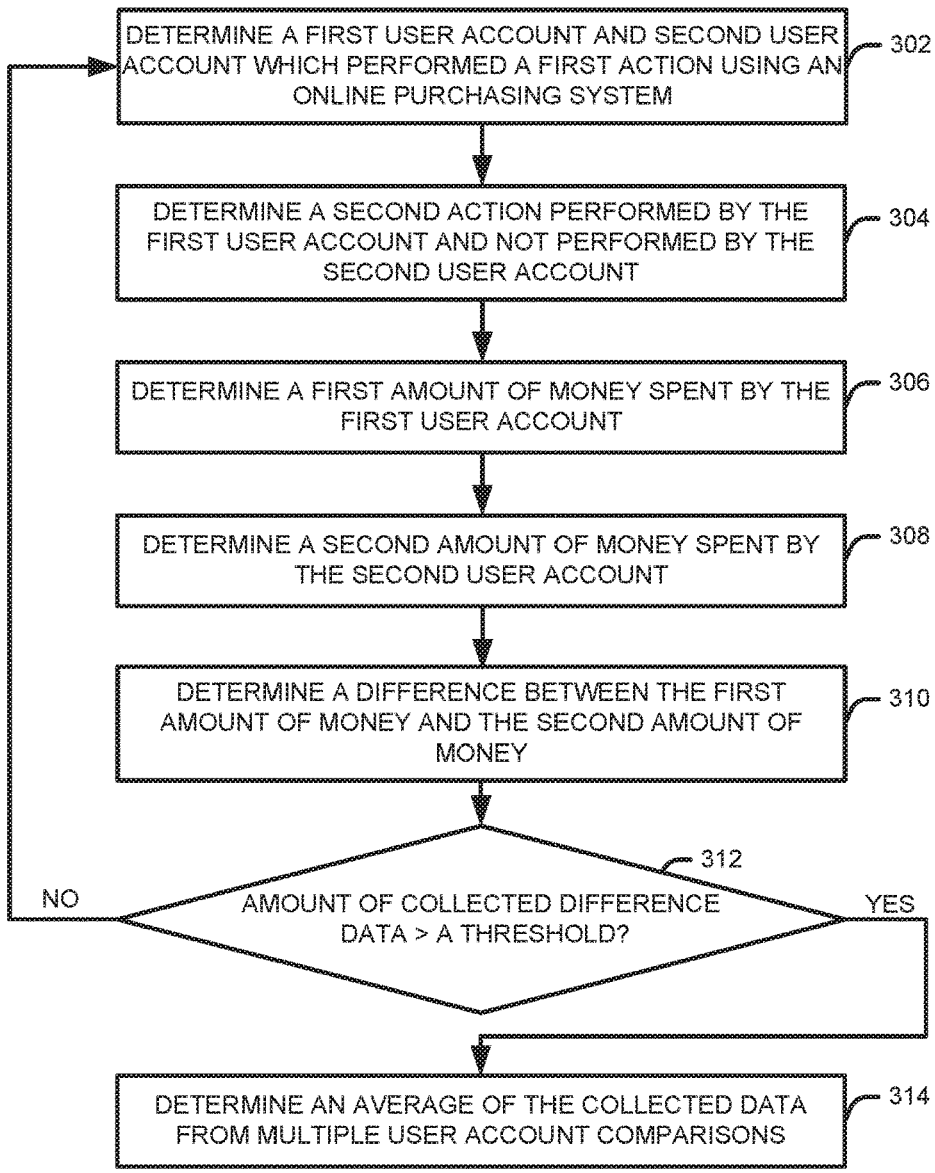
FIG. 3 illustrates a flow diagram for a process for performing segmented impact analysis for computer-based actions, in accordance with one or more example embodiments of the present disclosure.

FIG. 3 illustrates a flow diagram for a process 300 for performing segmented impact analysis for computer-based actions, in accordance with one or more example embodiments of the present disclosure.

At block 302, a device (e.g., the online purchasing system 210 of FIG. 2) may determine a user accounts, including a first user account and a second user account, which performed a computer-based action using a network-accessible resource such as an online purchasing system (e.g., a web-based or mobile application-based system). The device may analyze data (e.g., data stored in the purchase history databases 214 and the customer databases 215 of FIG. 2) to identify user accounts and the actions performed by the user accounts using the online purchasing system, such as creating accounts, viewing product pages, adding products to a virtual shopping cart or wish list, adding subscriptions, entering search terms, selecting categories of products, and other actions. The device may determine which actions are associated with the highest value, which may include actions that result in user accounts significantly increasing the respective amounts of money spent by the user accounts. The device may identify related users by finding user accounts which both performed the same action. The device may determine multiple categories/segments, and identify user accounts who share those categories/segments, along with demographics and spending patterns (e.g., similar or the same spending amounts over time). User accounts who exhibit the same or similar amounts of spending over a time period, and who share multiple categories/segments, may be considered similar/related user accounts to compare if one of the user accounts performed an action and the other user account did not perform the action. For example, a user account associated with a high spend amount (e.g., above a threshold amount) may be examined by the device to determine which categories/segments with which the user account may be associated. The device may determine, from among such categories/segments associated with the user account, other user accounts with similar spending habits, but who have not taken the same action that the first user account did.

At block 304, the device may determine an action performed by one of the related users and not performed by the other. For example, both users may have purchased the same product, but one of those users may have created a gift registry while the other user did not. The device may determine the value of the action taken by one user and not taken by the other user by analyzing the amounts of money spent by the users after the one user performed the action. The action selected for analysis may be a known high-valued action associated with significantly increased spending among a general population of user accounts, or based on significant increases in spending associated with user accounts in a particular category/segment. Whether the selected action is of high value may be unknown and discoverable by analyzing the amount of increased spend associated with users who perform the action.

At block 306, the device may determine the amount of money spent by the user account who performed the action. For example, if the user account spent X before establishing a gift registry and spent Y after establishing the gift registry, and if Y is greater than X, then the device may identify that establishing the gift registry may have resulted in an increased amount of money spent. To determine the significance of that increased spend, however, the device may compare the increased spend to the other related user account's spend over the same time period. For example, if the user account increase spending by $100 after establishing a gift registry and the other related user account increased spending by $100 without establishing a gift registry, the device may determine that the establishment of a gift registry did not cause the spending increase, and/or that the value of establishing the gift registry may not be any higher than the value of another action taken by the other related user who did not establish a gift registry.

At block 308, the device may determine the amount of money spent by the user account who did not perform the action during a time period after the other user performed the action. In this manner, the device may compare the spending of related user accounts over the same time period to determine if performance of an action correlates to an increase in spending when compared to non-performance of the action.

At block 310, the device may determine a difference between the amount of money spent by the user who performed the action and the amount of money spent by the user who did not perform the action during a time period after the performance of the action by the first user. For example, in the time period beginning when the first user performed the action and extending to present day, whether the first user spent more money than the second user who did not perform the action may be determined, or whether the first user's increase in spend after performing the action is greater than the increase in spend of the second user who did not perform the action may be determined. This value may be indicative of the impact analysis value for the action. If the value is positive, it may be used for recommendations. The difference may be analyzed for consideration against one or more thresholds. For example, if the difference exceeds a threshold value, the difference may be considered significant, and may result in the identification of a high-valued action which may be ranked (e.g., by the recommendation processors 218) accordingly.

At block 312, the device may determine whether the amount of collected data indicating spending differences among similar/related user accounts (e.g., including the first user account and the second user account) is sufficient (e.g., exceeds a threshold). The device may perform comparisons of similar/related users across multiple segments. For example, users of a particular demographic who have a premium subscription with an online purchasing system and have bought one or more of the same or similar products may be compared to one another if their respective account spending over a time period is the same or similar (e.g., within a threshold amount of spending difference). The device may determine, for any respective similar/related pair of user accounts, a difference in spend between one user account which performed an action and a similar/related user account which did not perform the same action. The device may determine whether the amount of collected spending differences from user account pairs exceeds a threshold. The threshold may be based on the number of similar/related user pairs may exist using one or more segments/categories. For example, the threshold may require that all possible pairs are analyzed for impact analysis values of an action, or that a percentage less than all possible user pairs is analyzed for impact analysis values. If the amount of data is sufficient, the device may continue the process 300 at block 314. If the device determines that more data may be needed (e.g., the amount of collected data is below a threshold), the process 300 may return to block 302 where additional user accounts may be identified and analyzed for impact analysis values of a particular action among users in multiple segments.

At block 314, the device may determine an average impact analysis value of the action using the data collected from among multiple similar/related user pairs. The individual related/similar user comparisons for a particular action, in which one user account performs the action and the other user account does not perform the action, may be aggregated and summed. The total/aggregated data from across a particular segment or across multiple segments may be averaged by the device, and the average value may be used as the impact analysis value of performing an action. The device may use the average value to determine and send a recommendation (e.g., a product recommendation) based on the difference. If the difference is significant, the device may determine that the action performed by the first user account and not performed by the third user account is of high value. High-valued actions may be ranked/prioritized over lower valued actions (e.g., actions whose increased spend compared to the spend of user accounts which did not perform the actions is lower). Sending recommendations may include sending notifications to a user account, presenting advertisements on a webpage, sending emails, texts messages, or other types of notifications to devices (e.g., user devices 202 of FIG. 2) or accounts, and other incentives to perform an action determined to be of significant value. The recommendations sent to a user may be based on information regarding the user.

Figure 4:
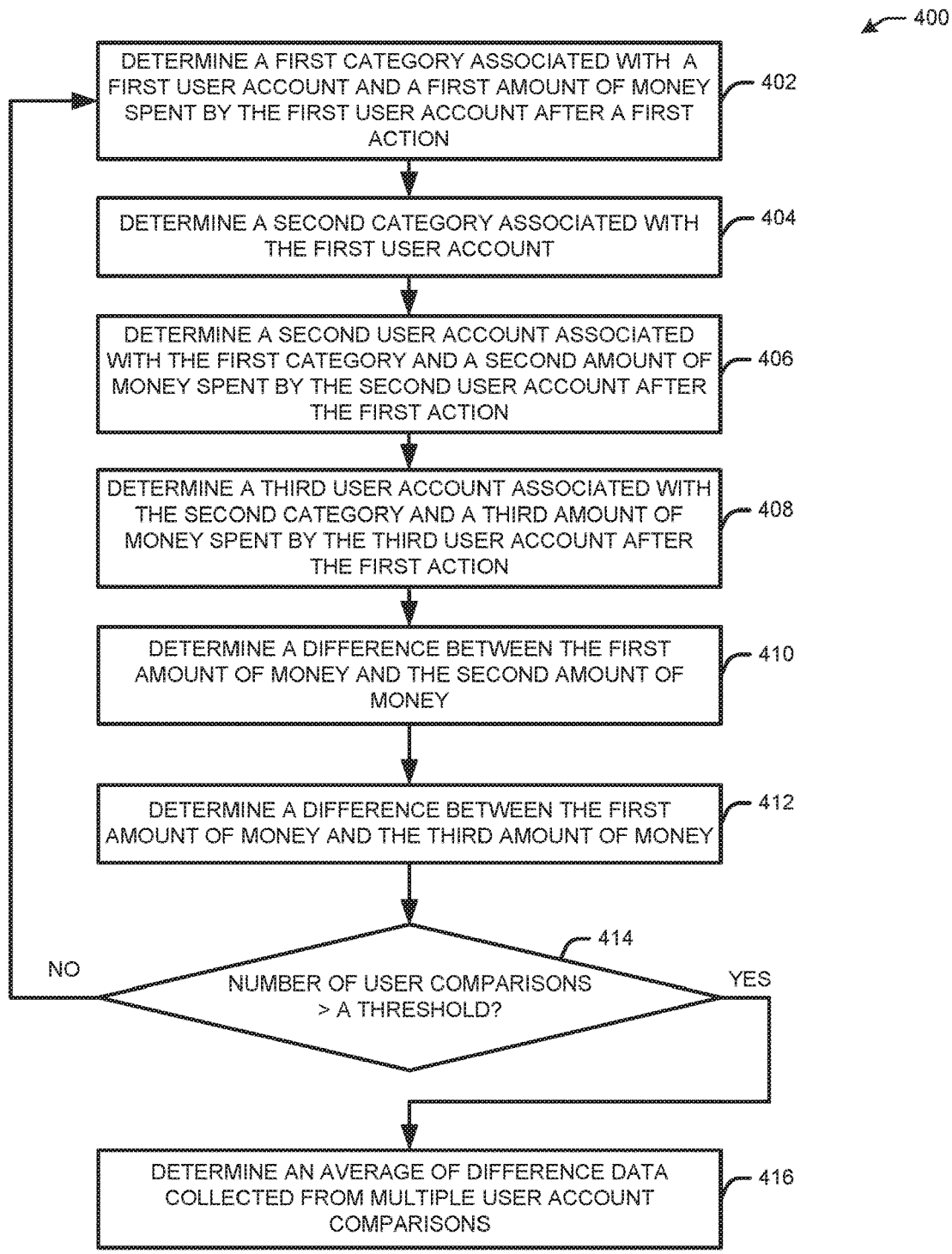
FIG. 4 illustrates a flow diagram for a process for performing segmented impact analysis for computer-based actions, in accordance with one or more example embodiments of the present disclosure.

FIG. 4 illustrates a flow diagram for a process 400 for performing segmented impact analysis for computer-based actions, in accordance with one or more example embodiments of the present disclosure.

At block 402, a device (e.g., the online purchasing system 210 of FIG. 2) may determine a first category/segment associated with a first user account, and the amount of money spent by the first user account using a network-accessible resource such as an online purchasing system (e.g., a web-based or mobile application-based system). At block 404, the device may determine a second category/segment associated with the first user account. The device may determine categories/segments associated with a user account to identify high-valued actions and related user accounts so that the device may determine the value of performing an action. For example, the device may identify a user account associated with a high spending amount (e.g., a threshold amount above the average spending of user accounts). Once a first user account associated with high spending has been identified, the device may determine characteristics about the user account, such as which categories/segments a user account belongs to, as the categories/segments may be indicative of search history, purchase history, subscriptions, user preferences, spending amounts, etc. A user account associated with a high spending amount may be useful in determining which actions the user has taken and have resulted more spending (e.g., high-valued actions).

At block 406, the device may use the information regarding the first user account to find a second user account sharing the first category/segment with the first user account. At block 408, the device may use the information regarding the first user account to find a third user account sharing the second category/segment with the first user account. The device may consider which user accounts have something in common with the first user account in order to identify a good match for use in comparing spending. For example, the device may determine that the first user has performed an action, and that the second and third users have not performed the action. The device may determine whether the second user or third user is a better user to compare to the first user for determining the value of the first user's performance of the action that the second and third users did not perform.

At block 410, the device may determine a difference between the amount of money spent by the first user who performed the action and the amount of money spent by the second user who did not perform the action during a time period after the performance of the action by the first user. At block 412, the device may determine a difference between the amount of money spent by the first user who performed the action and the amount of money spent by the third user who did not perform the action during a time period after the performance of the action by the first user. The difference values may be indicative of the impact analysis value for the action. The difference values may be analyzed for consideration against one or more thresholds. For example, if a respective difference exceeds a threshold value, the difference may be considered significant, and may result in the identification of a high-valued action which may be ranked (e.g., by the recommendation processors 218) accordingly.

At block 414, the device may determine whether the number of collected similar/related user comparisons (e.g., including the comparison between the first user's spending and the second user's spending, and the comparison between the first user's spending and the third user's spending) indicating spending differences among similar/related user accounts exceeds a threshold. The device may perform comparisons of similar/related users across multiple segments. For example, users of a particular demographic who have a premium subscription with an online purchasing system and have bought one or more of the same or similar products may be compared to one another if their respective account spending over a time period is the same or similar (e.g., within a threshold amount of spending difference). The device may determine, for any respective similar/related pair of user accounts, a difference in spend between one user account which performed an action and a similar/related user account which did not perform the same action. The device may determine whether the amount of collected spending differences from user account pairs exceeds a threshold. The threshold may be based on the number of similar/related user pairs may exist using one or more segments/categories. For example, the threshold may require that all possible pairs are analyzed for impact analysis values of an action, or that a percentage less than all possible user pairs is analyzed for impact analysis values. If the amount of data is sufficient, the device may continue the process 400 at block 416. If the device determines that more data may be needed (e.g., the amount of collected data is below a threshold), the process 400 may return to block 402 where additional user accounts may be identified and analyzed for impact analysis values of a particular action among users in multiple segments.

At block 416, the device may determine an average impact analysis value of the action using the data collected from among multiple similar/related user pairs. The similar/related user pairs may include the first and second user pair, and the first and third user pair. The individual related/similar user comparisons for a particular action, in which one user account performs the action and the other user account does not perform the action, may be aggregated and summed. The total/aggregated data from across a particular category/segment or across multiple categories/segments may be averaged by the device, and the average value may be used as the impact analysis value of performing an action. The device may use the average value to determine and send a recommendation (e.g., a product recommendation) based on the difference. If the difference is significant, the device may determine that the action performed by the first user account and not performed by the third user account is of high value. High-valued actions may be ranked/prioritized over lower valued actions (e.g., actions whose increased spend compared to the spend of user accounts which did not perform the actions is lower). Sending recommendations may include sending notifications to a user account, presenting advertisements on a webpage, sending emails, texts messages, or other types of notifications to devices (e.g., user devices 202 of FIG. 2) or accounts, and other incentives to perform an action determined to be of significant value. The recommendations sent to a user may be based on information regarding the user.

Figure 5:
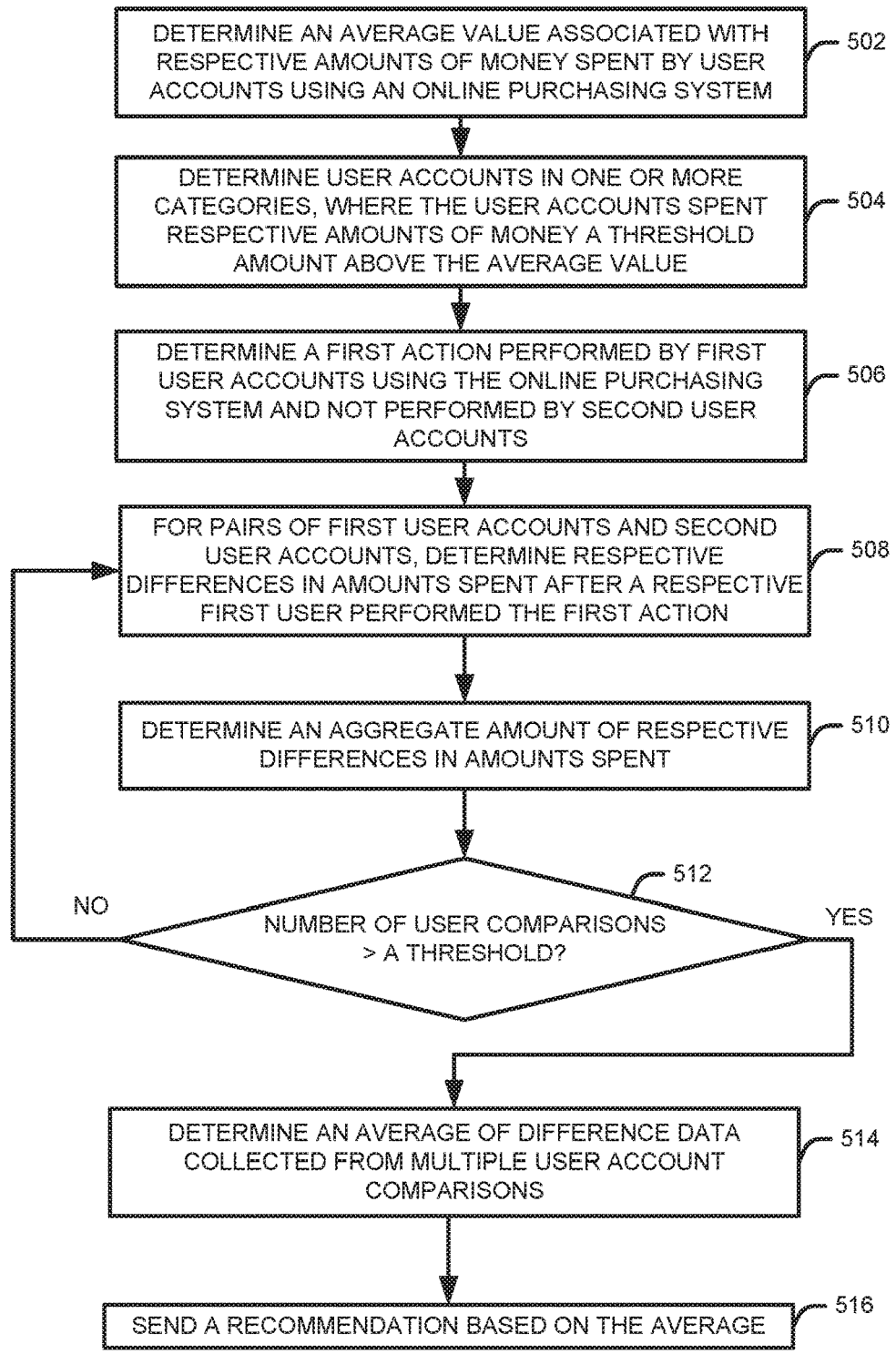
FIG. 5 illustrates a flow diagram for a process for performing segmented impact analysis for computer-based actions, in accordance with one or more example embodiments of the present disclosure.

FIG. 5 illustrates a flow diagram for a process 500 for performing segmented impact analysis for computer-based actions, in accordance with one or more example embodiments of the present disclosure.

At block 502, a device (e.g., the online purchasing system 210 of FIG. 2) may determine an average value associated with the respective amounts of money spent by user accounts using a network-accessible resource such as an online purchasing system (e.g., a web-based or mobile application-based system). The average value may be among a general population or all of the user accounts, or may be from among user accounts in one or more categories/segments. The average value spent may be calculated over a given time, such as within the current year or the previous year.

At block 504, the device may determine user accounts which spent respective amounts of money significantly above the average amount during the timeframe. The device may identify user accounts sharing categories/segments and who spent large amounts over a timeframe, and may determine whether a user account's spend during the timeframe is above a threshold amount more than a respective average. Such users may be identified as high-valued user accounts, and the device may evaluate their action histories (e.g., search history, page views, purchases, subscriptions, demographics, etc.) to identify what actions have cause them to spend more money. When user accounts are associated with similar spending amounts over a time period and with multiple segments/categories, the user accounts may be considered similar/related users for the purpose of analyzing user account pairs. For example, user accounts associated with expecting mothers who have searched for an purchased certain types of products may be evaluated as pairs to determine the value of one user account performing an action such as establishing a baby registry and the other user not doing so.

At block 506, the device may determine a first action performed by a first set of user accounts using the online purchasing system. The device may evaluate whether other user accounts are similar/related to the first set of user accounts by analyzing whether any other user accounts also performed the first action. Multiple related/similar user accounts may be evaluated for having performed the action. For example, multiple pairs of user accounts may be identified by finding user account pairs in which one user account performed the action, and the other user account did not perform the action. Each pair of user accounts may be evaluated to determine an impact analysis value associated with performance of the action.

At block 508, the device may, for respective pairs of similar/related user accounts, determine respective differences between the user accounts in terms of spending amounts after one of the user accounts of a respective pair performed an action. For example, in a respective user account pair, one user account may have performed the first action, and the other user account may not have performed the first action. If the first action is establishing a gift registry, the device may determine how much money the first user account of the pair spent after establishing the gift registry and how much money the second user account of the pair spent after the first user account established the gift registry. If the first user account and second user account of a pair spent similar amounts of money before the first user account established the gift registry, and if their respective spending amounts are different after the first user account established the gift registry, then the difference in amounts spent by the user accounts of the pair may be considered a value for having established the gift registry. Performing such comparisons across multiple user account pairs, the device may determine and collect multiple values representing having performed an action.

At block 510, the device may determine an aggregate amount of the respective values/differences representative of the differences in amounts spent between the respective user accounts of a pair for a given action. For example, if multiple pairs of similar/related user accounts are used to determine values for establishing a gift registry (e.g., if the first action is establishing a gift registry using an online purchasing system), a comparison of any respective pair may result in the device determining a value for establishing the gift registry. The device may add the values of establishing a gift registry from among multiple pairs (e.g., all or a portion of possible pairs across multiple categories/segments).

At block 512, the device may determine whether the number of collected similar/related user comparisons (e.g., including the comparison between the first user's spending and the second user's spending, and the comparison between the first user's spending and the third user's spending) indicating spending differences among similar/related user accounts exceeds a threshold. The device may perform comparisons of similar/related users across multiple segments. For example, users of a particular demographic who have a premium subscription with an online purchasing system and have bought one or more of the same or similar products may be compared to one another if their respective account spending over a time period is the same or similar (e.g., within a threshold amount of spending difference). The device may determine, for any respective similar/related pair of user accounts, a difference in spend between one user account which performed an action and a similar/related user account which did not perform the same action. The device may determine whether the amount of collected spending differences from user account pairs exceeds a threshold. The threshold may be based on the number of similar/related user pairs may exist using one or more segments/categories. For example, the threshold may require that all possible pairs are analyzed for impact analysis values of an action, or that a percentage less than all possible user pairs is analyzed for impact analysis values. If the amount of data is sufficient, the device may continue the process 500 at block 514. If the device determines that more data may be needed (e.g., the amount of collected data is below a threshold), the process 500 may return to block 508 where additional user account pairs may be identified and analyzed for impact analysis values of a particular action among users in multiple segments.

At block 514, the device may determine an average of the values determined for an action using multiple user account pairs. At block 516, the device may determine and send a recommendation based on the average value. Sending recommendations may include sending notifications to a user account, presenting advertisements on a webpage, sending emails, texts messages, or other types of notifications to devices (e.g., user devices 202 of FIG. 2) or accounts, and other incentives to perform an action determined to be of significant value. The recommendations sent to a user may be based on information regarding the user.

Figure 6:
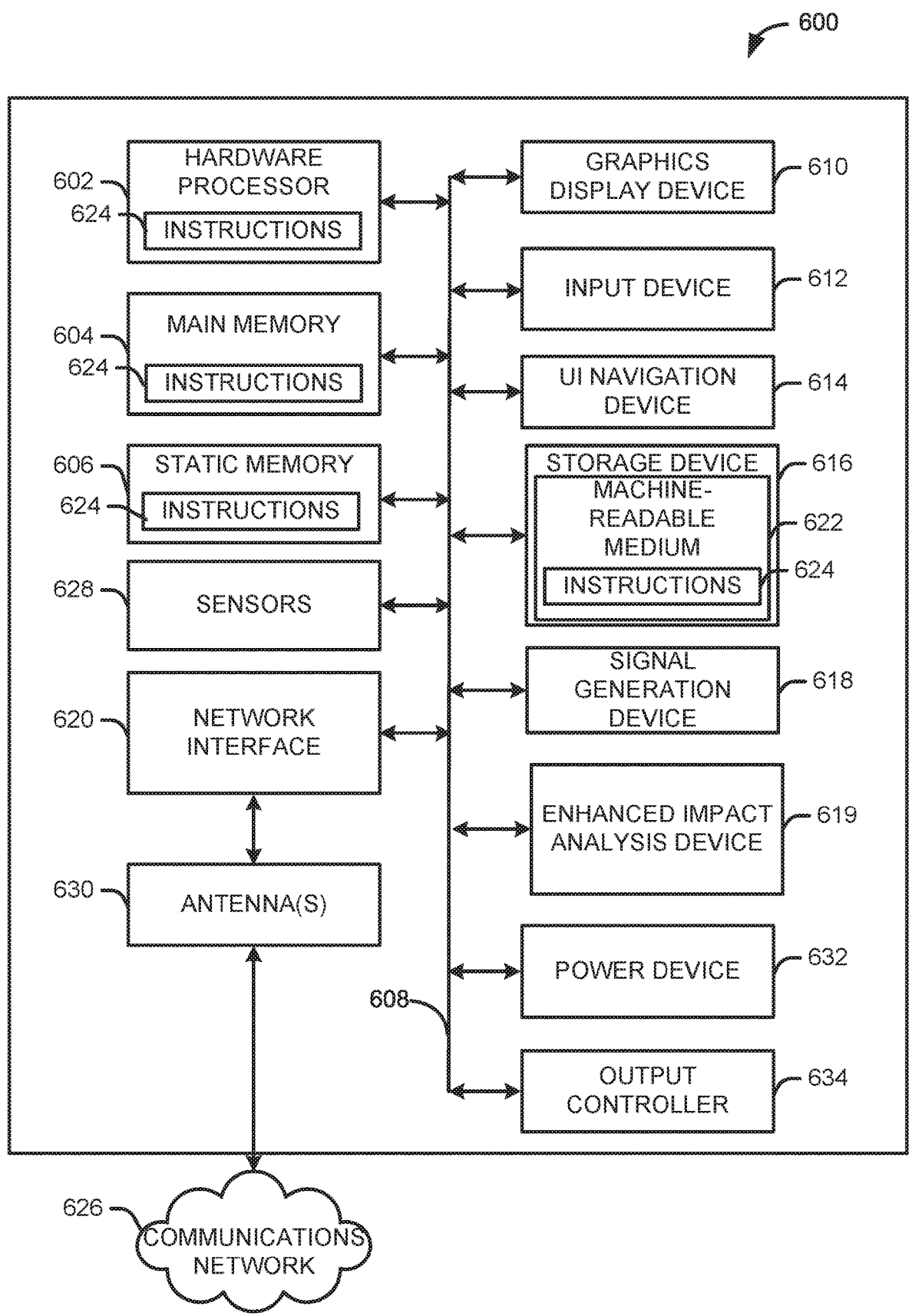
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the device 110 of FIG. 1, the user devices 202 of FIG. 2, the online purchasing system 210 of FIG. 2) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P) (or other distributed) network environments. The machine 600 may be a server, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), an enhanced impact analysis device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The enhanced impact analysis device 619 may carry out or perform any of the operations and processes (e.g., process 300 of FIG. 3, process 400 of FIG. 4, process 500 of FIG. 5) described and shown above.

The enhanced impact analysis device 619 may calculate a value (e.g., an impact analysis value) for any computer-based action taken in association with the online purchasing system. The value may represent an incremental benefit of taking an action compared to not taking the action. The value may be devoid of customer-specific information (e.g., demographics, user event history, purchase history, search history, etc.). Because the value may be disconnected from customer-specific information, the value may not provide an accurate representation of the difference between performing an action and not performing the action. For example, when considering the value of watching a video, examining the average value (e.g., an average amount of money spent) from among any users who watch a video may result in a value indicating a small impact of watching a video versus not watching a video. This may be because the average amount of money spent by users who did not watching a video may be affected by many factors, so the comparison between watching a video and not watching a video may not be a "like-to-like" comparison.

The enhanced impact analysis device 619 may determine a value for performing an action and may use the value to determine which actions to incentivize, recommend, advertise, etc. For example, if a purchasing a premium subscription with an online purchasing system results in a significantly higher spend than not purchasing a premium subscription, then the purchase of a premium subscription may be associated with a high value. A high-valued action may be an action which should be promoted, so incentives and targeted advertisements may be prioritized to promote higher valued actions over lower valued actions.

The enhanced impact analysis device 619 may use characteristics such as demographics, search history, purchase history, subscriptions, user preferences, and others to identify similar users. For example, if a user establishes a gift registry, to determine the value of establishing the gift registry, a similar user who did not establish a gift registry may be identified. If a user establishes a gift registry and is engaged to be married (e.g., as indicated by user input, analysis of user search or purchase history, social media status, etc.), the value of the gift registry may be enhanced by comparing another user engaged to be married, but who did not establish a gift registry. The value therefore may be more specific than establishing a gift registry, and may represent the value of an engaged person in establishing a gift registry. In this manner, a subset of users and their associated monetary spends may be analyzed for value in performing an action rather than the values being skewed by a larger sample size of users whose spends may be impacted by a variety of factors.

The enhanced impact analysis device 619 may use a customer-segmented impact analysis to evaluate the impact of performing an action associated with a purchasing web site given a criteria. Such may result in more customer-based value determinations by taking any sub-segments (e.g., categories of customers based on demographics, search and/or purchase history, users preferences, etc.) with which a user or user account is associated, determining a value for a specific action performed by the users or user accounts in the sub-segments, and comparing the value of such customers compared to similar customers who did not perform the same action. When actions are determined to have high values, recommendations may be based on those actions.

The enhanced impact analysis device 619 may consider related users, for example, based on similar amounts of money the users spend. Comparing users who spent a similar amount of money over a given time period, the value of one user performing an action compared to the other user not performing the action may provide a customer-based value for performing the action.

The enhanced impact analysis device 619 may consider segments/categories/sub-segments based on purchase history, search history, demographics, user preferences, and other characteristics and actions. Related users and high-valued users may be discoverable using segments/categories/sub-segments. For example, the enhanced impact analysis device 619 may determine which users spent the most money after performing an action. When a user has a high value (e.g., when the amount of money a customer spent is a threshold amount above an average amount of money for related users), the enhanced impact analysis device 619 may identify characteristics about the user, such as to which segments/categories/sub-segments a user belongs. For example, if a user who spends an amount of money significantly higher than the average amount spent by all or a subset of users, the online purchasing system may determine which items a user searched or purchased. The enhanced impact analysis device 619 may determine similar users who did not search for or purchase the same items and may determine the difference between the amount of money spent by the user who purchased or searched for the items and the amount of money spent by the user who did not search for or purchase the items. The difference may represent a monetary value considered as the impact analysis value of the action performed.

The enhanced impact analysis device 619 may rank actions based on the values associated with the actions. For example, an action with a higher value may be ranked higher than an action with a lower value. In this manner, the ability of the online purchasing system to prioritize actions may be improved using enhanced segmented impact analysis of computer-based actions which account for user behavior in addition to spend. Advertisements, notifications, prioritization of displayed information, and other incentives for actions may be improved by leveraging computer-based identification of actions taken in association with an online purchasing system. Both user experience and computer performance may be improved by enhancing the determination of impact analysis values for computer-based actions, as a computer may identify specific subsets of users, reducing the processing resources needed to calculate impact analysis values and to reevaluate less effective notifications and advertisements based on inaccurate value determinations, and a user may be presented with more relevant options and incentives for use with the online purchasing system.

It is understood that the above are only a subset of what the enhanced impact analysis device 619 may be configured to perform and that other functions included throughout this disclosure may also be performed by the enhanced impact analysis device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Wi-Fi®, WiMax®), and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
receiving, by at least one processor coupled to memory of a server machine, a plurality of purchase requests, over a network, for a set of user accounts of an online-purchasing system hosted by the server machine;
storing, in a database, purchase histories for the set of user accounts based on the plurality of purchase requests;
determining, by the at least one processor, a subset of the set of user accounts of the online-purchasing system, wherein the subset of user accounts is defined based on users accounts of the subset being associated with performance of a first computer-based transaction associated with an online-purchasing resource, wherein the first computer-based transaction comprises a first online purchase or subscription;
determining, by the at least one processor, one or more user account pairs in which one user account of the subset of user accounts performed a second computer-based transaction associated with the online-purchasing resource, wherein the second computer-based transaction comprises a second online purchase or subscription and another user account of the subset of user accounts did not perform the second computer-based transaction; and
for a user account pair of the one or more user account pairs:
  determining, by the at least one processor and using the database, that a first user account of the user account pair spent a first amount of money using the online purchasing resource during a first time period, wherein the first user account is associated with performance of the second computer-based transaction;
  determining, by the at least one processor and using the database, that a second user account of the user account pair spent a second amount of money using the online purchasing resource during the first time period, wherein the second user account is associated with failure to perform the second computer-based transaction;
  determining, by the at least one processor, based on the first amount of money and the second amount of money, that the first user account and the second user account are similar accounts;
  determining, by the at least one processor, a first monetary value associated with the first user account, wherein the first monetary value is based on the performance of the second computer-based transaction during a second time period;
  determining, by the at least one processor, a second monetary value associated with the second user account, wherein the second monetary value is based on the failure to perform the second computer-based transaction during the second time period;
  determining, by the at least one processor, based on the first monetary value and the second monetary value, an impact analysis value for the second computer-based transaction representing a difference between performance of the second computer-based transaction and non-performance of the second computer-based transaction;
  determining, by the at least one processor, that the impact analysis value exceeds a threshold monetary value, thereby indicating the second computer-based transaction is a high-value action;
  generating, by the at least one processor, a graphical notification associated with the high-value action;
  sending, by the at least one processor, the graphical notification to the second user account via the network to a device associated to the second user account, wherein the graphical notification provides the device with access to an online purchase interface that allows the second user to perform the second computer-based transaction; and
  receiving, by the at least one processor, an indication via the network from the device associated with the second user account that the second user accessed the online purchase interface via the graphical notification.

2. The method of claim 1, further comprising:
determining the graphical notification based on determining that the first user account and the second user account are similar accounts.

3. The method of claim 1, wherein the performance of the first computer-based transaction includes purchasing a first product, wherein the performance of the second computer-based transaction includes purchasing a second product, wherein the failure to perform the second computer-based transaction includes failure to purchase the second product.

4. The method of claim 1, wherein the performance of the first computer-based transaction includes providing a search input for a first product, wherein the performance of the second computer-based transaction includes providing a search input for a second product, wherein the failure to perform the second computer-based transaction includes failure to provide the search input for the second product.

5. The method of claim 1, wherein the performance of the first computer-based transaction includes viewing a page associated with the online purchasing resource, wherein the performance of the second computer-based transaction includes selecting a product, wherein the failure to perform the second computer-based transaction includes failure to select the product.

6. The method of claim 1, further comprising:
determining a third user account associated with the performance of the first computer-based transaction;
determining that the first user account spent the first amount of money using the online purchasing resource after the performance of the first computer-based transaction;
determining that the second user account spent the second amount of money using the online purchasing resource after the performance of the first computer-based transaction;
determining that the third user account spent a third amount of money using the online purchasing resource after the performance of the first computer-based transaction;
determining that the first amount of money and the second amount of money exceed a threshold; and
determining that the third amount of money is less than the threshold.

7. The method of claim 1, further comprising determining a user demographic associated with the first user account and the second user account, wherein the first monetary value and the second monetary value are based on the user demographic.

8. The method of claim 1, wherein a third value is the difference between the first monetary value and the second monetary value, and wherein the third value is associated with the graphical notification, the method further comprising:
   determining a fourth monetary value associated with a third user account performing the second computer-based transaction;
   determining a fifth monetary value associated with a fourth user account failing to perform the second computer-based transaction;
   determining a sixth value, wherein the sixth value is a difference between the fourth monetary value and the fifth monetary value;
   determining, based on the third value and the sixth value, first average value, wherein the first average value is associated with the second computer-based transaction;
   determining a second average value associated with a third computer-based transaction;
   determining that the first average value is greater than the second average value; and
   sending a graphical notification associated with the second computer-based transaction.

9. The method of claim 1, wherein a third value is the difference between the first monetary value and the second monetary value, and wherein the third value is associated with the graphical notification, the method further comprising:
   determining that the first user account is associated with a first group of user accounts and a second group of user accounts; and
   determining that the second user account is associated with the first group of user accounts and the second group of user accounts, wherein determining the third value is based on determining that the first user account and the second user account are associated with the first group of user accounts and the second group of user accounts.

10. The method of claim 1, wherein a third value is the difference between the first monetary value and the second monetary value, the method further comprising:
   determining a first group of user accounts, the first group of user accounts including the first user account and the second user account;
   determining a second group of user accounts, the second group of user accounts including the first user account and a third user account, and the second group of user accounts excluding the second user account;
   determining that the third user account performed the first computer-based transaction;
   determining that the third user account failed to perform the second computer-based transaction;
   determining a fourth monetary value associated with the third user account, wherein the second monetary value is based on the failure to perform the second computer-based transaction;
   determining a fifth value, wherein the fifth value is a difference between the first monetary value and the fourth monetary value; and
   determining that the fifth value is less than the threshold monetary value.

11. The method of claim 1, further comprising:
   determining a first recommendation for the first user account, wherein the first recommendation is based on the performance of the second computer-based transaction;
   determining a second recommendation for the first user account, wherein the second recommendation is based on the performance of the first computer-based transaction;
   determining that a first ranking for the first recommendation is greater than a second ranking for the second recommendation; and
   presenting the first recommendation.

12. The method of claim 1, further comprising determining that the first user account and the second user account purchased a subscription, wherein determining that the first user account and the second user account are similar users is further based on determining that the first user account and the second user account purchased the subscription.

13. The method of claim 1, wherein determining that the first user account and the second user account are similar users comprises:
   determining a difference between the first amount of money spent by the first user account and the second amount of money spent by the second user account; and
   determining that the difference between the first amount of money and the second amount of money is less than a threshold amount of money.

14. The method of claim 1, wherein a third value is the difference between the first monetary value and the second monetary value, the method further comprising:
   determining that the first user account purchased a third product using the online purchasing resource;
   determining that the second user account failed to purchase the third product using the online purchasing resource;
   determining a third monetary value associated with the first user account, wherein the third monetary value is based on a first user demographic associated with the first user account, and the first user account's purchase of the third product;
   determining a fourth monetary value associated with the second user account, wherein the fourth monetary value is based on a second user demographic associated with the second user account, and the second user account's failure to purchase the third product;
   determining a fourth value, wherein the fourth value is a difference between the third monetary value and the fourth monetary value; and
   determining that the fourth value is less than or equal to the threshold monetary value.

15. A device, comprising memory coupled to at least one processor, the at least one processor configured to:
   receive a plurality of purchase requests, over a network, for a set of user accounts of an online-purchasing system hosted using the device;
   storing, in a database, purchase histories for the set of user accounts based on the plurality of purchase requests;
   determine a subset of the set of user accounts of the online-purchasing system that are associated with performance of a first computer-based transaction, wherein the first computer-based transaction comprises a first online purchase or subscription;
   determine, from the subset of the set of user accounts, a first user account associated with performance of the first computer-based transaction and performance of a second computer-based transaction, wherein the second computer-base transaction comprises a second online purchase or subscription, further wherein the first computer-based transaction and the second computer-based transaction are associated with an online purchasing resource;

determine, from the subset of the set of user accounts a second user account associated with the performance of the first computer-based transaction and with failure to perform the second computer-based transaction; and as a result of determining that the first user account is associated with performance of the second computer-based transaction and that the second user is associated with failure to perform the second computer-based transaction:

determine, using the database, that the first user account spent a first amount of money using the online purchasing resource during a first time period;

determine, using the database that the second user account spent a second amount of money using the online purchasing resource during the first time period;

determine, based on the first amount of money and the second amount of money, that the first user account and the second user account are similar accounts;

determine a first monetary value associated with the first user account, wherein the first monetary value is based on the performance of the second computer-based transaction during a second time period;

determine a second monetary value associated with the second user account, wherein the second monetary value is based on the failure to perform the second computer-based transaction during the second time period;

determine, based on the first monetary value and the second monetary value, an impact analysis value for the second computer-based transaction representing a difference between performance of the second computer-based transaction and non-performance of the second computer-based transaction determine that the impact analysis value exceeds a threshold monetary value, thereby indicating the second computer-based transaction is a high-value action;

generate a graphical notification associated with the high-value action;

send the graphical notification to a second device associated with the second user account via the network that is able to view the graphical notification through an online purchasing interface; and receive an indication via the network from the device associated with the second user account that the second user accessed the online purchasing interface via the graphical notification.

16. The device of claim 15, wherein the at least one processor is further configured to:

determine a user demographic associated with the first user account and the second user account; and determining the graphical notification on determining that the first user account and the second user account are similar accounts, wherein determining that the first user account and the second user account are similar accounts are further based on the user demographic.

17. The device of claim 15, wherein the at least one processor is further configured to:

determine a third user account associated with the performance of the first computer-based transaction;

determine that the first user account spent the first amount of money using the online purchasing resource after the performance of the first computer-based transaction;

determine that the second user account spent the second amount of money using the online purchasing resource after the performance of the first computer-based transaction;

determine that the third user account spent a third amount of money using the online purchasing resource after the performance of the first computer-based transaction;

determine that the first amount of money and the second amount of money exceed a threshold; and determine that the third amount of money is less than the threshold.

18. The device of claim 15, wherein a third value is the difference between the first monetary value and the second monetary value, wherein the at least one processor is further configured to:

determine a fourth monetary value associated with a third user account performing the second computer-based transaction;

determine a fifth monetary value associated with a fourth user account failing to perform the second computer-based transaction;

determine a sixth value, wherein the sixth value is a difference between the fourth monetary value and the fifth monetary value;

determine, based on the third value and the sixth value, a first average value, wherein the first average value is associated with the second computer-based transaction;

determine a second average value associated with a third computer-based transaction;

determine that the first average value is greater than the second average value; and send a recommendation associated with the second computer-based transaction.

19. The device of claim 15, wherein a third value is the difference between the first monetary value and the second monetary value, wherein the at least one processor is further configured to:

determine a first group of user accounts, the first group of user accounts including the first user account and the second user account;

determine a second group of user accounts, the second group of user accounts including the first user account and a third user account, and the second group of user accounts excluding the second user account;

determine that the third user account performed the first computer-based transaction;

determine that the third user account failed to perform the second computer-based transaction;

determine a fourth monetary value associated with the third user account, wherein the second monetary value is based on the failure to perform the second computer-based transaction;

determine a fifth value, wherein the fifth value is a difference between the first monetary value and the fourth monetary value; and determine that the fifth value is less than the threshold monetary value.

20. The device of claim 15, wherein the at least one processor is further configured to determine that the first user account and the second user account purchased a subscription, wherein determining that the first user account and the second user account are similar users is further based on determining that the first user account and the second user account purchased the subscription.

21. The device of claim 15, wherein determining that the first user account and the second user account are similar users comprises:

determining a difference between the first amount of money spent by the first user account and the second amount of money spent by the second user account; and
determining that the difference between the first amount of money and the second amount of money is less than a threshold amount of money.

\* \* \* \* \*